June 8, 1954 G. A. COLEMAN 2,680,680
PRODUCTION OF COMPLETE FERTILIZERS
Filed Dec. 24, 1952
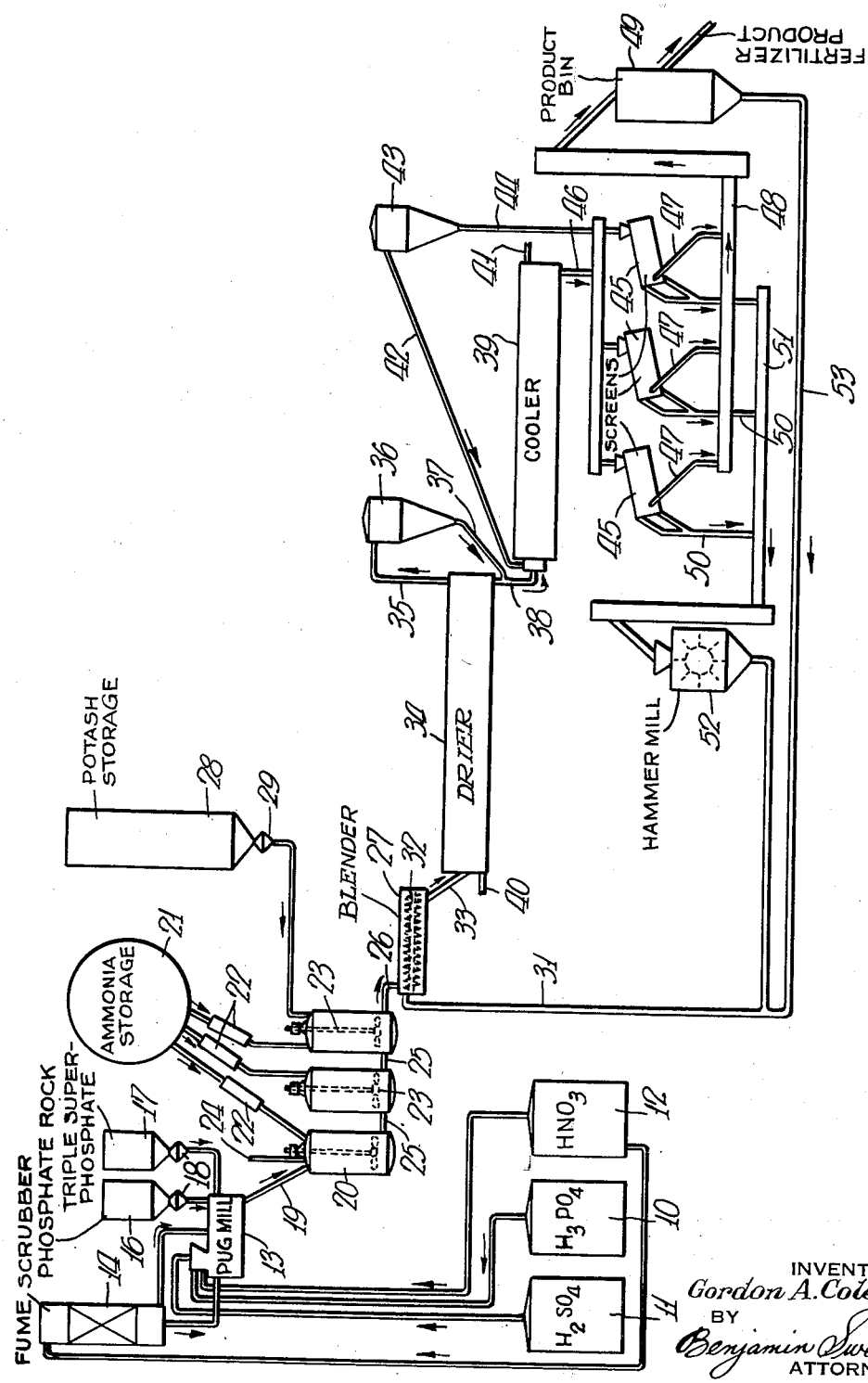
INVENTOR
*Gordon A. Coleman*
BY
*Benjamin Sweedler*
ATTORNEY Patented June 8, 1954

2,680,680

UNITED STATES PATENT OFFICE 2,680,680

PRODUCTION OF COMPLETE FERTILIZERS

Gordon A. Coleman, Petersburg, Va., assignor to Allied Chemical & Dye Corporation, New York, N. Y., a corporation of New York Application December 24, 1952, Serial No. 327,887

11 Claims. (Cl. 71—37)

This invention relates to the preparation of "complete" fertilizers, i. e., fertilizers containing nitrogen, phosphorus and potash in available form as plant nutrients.

It has been proposed to acidulate phosphate rock with sulfuric acid, nitric acid, or mixtures of sulfuric and nitric acid with or without phosphoric acid, ammoniate the acidulated material, add a potassium salt to the ammoniated mixture, granulate, and then dry to produce the fertilizer product. Processes of this type heretofore suggested have a number of disadvantages among which may be mentioned:

1. They usually produce excessively hygroscopic products. This is particularly the case when employing nitric acid to acidulate the rock.
2. They require excessively long ammoniation and acidulation treatments, thus reducing the capacity of the equipment.
3. They result in unstable products in that salt constituents, such, for example, as ammonium nitrate, tend to continue to react during storage.
4. They do not result in non-segregating, homogeneous particles in which each particle contains all of the constituents of the complete fertilizer and these constituents are present in substantially the same proportions in all of the particles.
5. They present difficult problems of material handling in carrying out the different steps of the process. Thus, such processes involving the use of concentrated acid to effect the acidulation result in heavy pasty masses which are difficult to agitate within the acidulator and to move from the acidulation zone to the ammoniators. Furthermore, the physical characteristics of the ammoniated mass are such that it is extremely difficult to move it through the driers and effect satisfactory drying. Breakdown of the drying equipment due, for example, to the formation of hard masses on the walls of the kiln driers usually employed, or breakage of the flights or baffles, which effect movement of the material through the driers, is not unusual.

It is among the objects of this invention to provide a process for producing complete fertilizers of lessened hygroscopicity, which process results in the production of hard, non-caking granules completely stabilized chemically and substantially each particle of which is a complete fertilizer, the particles being non-segregating, homogeneous and substantially alike in chemical composition. By "completely stabilized chemically" is meant that the phosphate is so chemically combined that it has little or no tendency to revert to a citrate insoluble form, also that other salts present have little or no tendency to react further during storage of the fertilizer.

Another object of this invention is to provide a process of producing a complete fertilizer of exceptionally high total plant food content without reducing the content of secondary plant food such as the calcium and sulfur.

Still another object of this invention is to provide a process of producing a complete fertilizer employing relatively low cost raw materials, such as phosphate rock, ammonia and nitric acid, in which process the acidulation of the phosphate rock and the ammoniation of the acidulated material is effected more efficiently and rapidly than in prior known processes and the condition of the reaction masses in the acidulator, ammoniator and drier is such that they can readily be moved and handled mechanically without fouling the equipment.

Other objects and advantages of this invention will be apparent from the following detailed description thereof:

In accordance with this invention phosphate rock is acidulated with a mixed acid consisting of nitric and sulfuric acids, nitric and phosphoric acids, or nitric, sulfuric and phosphoric acids employing from about 7 to about 20, preferable from about 9 to about 16, equivalents of mixed acid per mol of $P_2O_5$ in the phosphate rock. By an "equivalent of acid" is meant the quantity of acid which contains one formula weight of hydrogen ion, i. e., a half mol of $H_2SO_4$, one mol of $HNO_3$ and a half mol of $H_3PO_4$. $H_3PO_4$ for purposes of the present invention is considered a dibasic acid, because during the ammoniation of the acidulated rock dicalcium phosphate is formed, i. e., one hydrogen ion remains with the phosphoric acid. Of the mixed acid from about 40% to about 80%, preferably from about 60% to about 80%, of the equivalents of acid is nitric acid. When using a mixture of nitric and phosphoric acids it is preferred to use a mixed acid containing an amount of nitric acid in the upper portion of the range hereinabove given, i. e., 70% to 80% of the acid equivalents are nitric acid. The acidulation reaction is carried out in the presence of from about 15% to about 40%, preferably from about 30% to about 40%, water based on the total weight of constituents present in the acidulator.

The acidulated mixture is ammoniated employing from about 0.6 to about 0.8 mols of ammonia per equivalent of acid used in the acidulation. The ammoniated material as it leaves the ammoniator should have a water content of from about 15% to about 30%, preferably from about 15% to about 18% based on the weight of the material leaving the ammoniator and including the weight of the potassium salt which is preferably added prior to completion of the ammoniation. During the course of the ammoniation about half of the water introduced into the ammoniator is evaporated. The water content of the acidulated mixture withdrawn from the acidulator and introduced into the ammoniator is therefore adjusted, if necessary, by the addition of water to the acidulated material entering the ammoniator so that the material leaving the ammoniator has a water content within the range above noted.

As above indicated, potassium in the form of its salts, such as potassium chloride or potassium sulfate, is incorporated in the ammoniated material. Preferably the potassium salt is incorporated prior to completion of the ammoniation of the acidulated mixture although, if desired, it may be added after the ammoniation has been completed. Other salt enriching constituents which may be absent from certain soils, such, for example, as the salts of copper, zinc, iron, manganese, molybdenum, cobalt, magnesium, boron, may also be incorporated during the latter stages of the ammoniation or after the ammoniation has been completed. Such salts are added in minor amounts, desirably in the form of the sulfate, chloride or carbonate. The resultant mass is then blended with dry product, recycled from a subsequent step of the process, which subsequent step is hereinafter described, to produce a mixture containing from about 15% to about 45%, preferably from about 25% to about 35% liquid (water plus dissolved salts) at the temperature of the blend. The temperature of the ammoniated mass leaving the ammoniator desirably is in the range of from about 75° to about 100° C., preferably from about 82° to about 93° C. This mixture is then passed through a drier to reduce its moisture content to 1% or 2% or less and thereafter cooled.

The phosphate rock employed in this process may be any form of phosphate rock commercially available. The rock may be employed in the coarse condition it comes from the mines, e. g., having a particle size such that it passes through a 30 to 40 mesh screen. Surprisingly it has been found that employing mixed acid in the amount and concentration hereinabove disclosed, such coarse phosphate rock can be acidulated rapidly and efficiently. However, for optimum acidulation at maximum rates, the rock is crushed to a size such that it passes a 100 mesh screen or finer. The rock subjected to acidulation may be mixed with triple superphosphate ($Ca(H_2PO_4)_2$ substantially free of calcium sulfate) if it is desired to produce a fertilizer having a higher $P_2O_5$ content than that obtained utilizing only the phosphate present in the rock. In general the amount of triple superphosphate added may be up to 30% or even higher, preferably from about 15% to about 20%, based on the weight of the phosphate rock. The introduction of triple superphosphate into the acidulator has the desirable advantage of converting insoluble calcium phosphate present in the triple superphosphate to the citrate-soluble form.

Using an amount of mixed acid including nitric acid and sulfuric or phosphoric acid, or nitric acid and mixtures of the latter two acids in the amounts above indicated results in substantially all of the calcium in the rock being transformed into dicalcium phosphate and calcium sulfate after the ammoniation treatment. As above noted, the acidulation is carried out in the presence of from about 15% to about 40%, preferably from about 30% to about 40% water. The use of such amounts of water is important not only because it results in a fluid mass which can readily be agitated with consequently more rapid acidulation but also because it permits of the use of available less costly dilute acids. Thus, dilute acids may be used to supply the desired water; where more concentrated acids are available and are used so that the water content of the reaction mixture does not fall within the range indicated, enough water is added to the reaction mixture to provide the desired water content. The acidulation is an exothermic reaction and may be carried out at any desired temperature below that at which substantial loss of nitrogen compounds takes place. The acidulation may be carried out without external cooling; by introducing the rock and the acid at atmospheric temperatures, the temperature of the acidulated mass in general will not go above about 74° C., at which temperature little or no loss of nitrogen compounds takes place. By observing the above noted conditions, the acidulation may be effected in from 5 to 10 minutes.

The ammoniation is carried out in single or multiple stages. As above indicated from 0.6 to 0.8 mols of ammonia are used per equivalent of acid employed in the acidulation. This amount of ammonia will neutralize all free acid and convert phosphoric acid and calcium nitrate to ammonium phosphate, dicalcium phosphate, and ammonium nitrate. The ammoniation is carried out at a temperature close to the boiling point of the mixture, preferably the ammoniation is carried out near the boiling point of the mixture and toward the end of the ammoniation the temperature is permitted to fall to about 80° C.

By observing the above noted ammoniation conditions the ammoniation may be effected in from 30 to 120 minutes.

Ammoniation of the acidulated mass under the conditions of temperature, water content and amount of ammonia above given results in (a) more rapid ammoniation, (b) the acidulated mass taking up substantially all of the ammonia introduced thereinto with consequent saving in ammonia and (c) a relatively free-flowing reaction mixture which can readily be handled mechanically.

Employing a multiple stage ammoniation procedure, potassium salts, such as potassium chloride and other soil enriching constituents, such as those hereinabove enumerated, are added in the last stage of the ammoniation. Similarly when carrying out the ammoniation in a single stage, potassium chloride and other soil enriching constituents may be added toward the end of the ammoniation treatment. By so doing, the reaction between the potassium salts and the ammonium nitrate to form stable salt pairs is promoted and less unreacted ammonium nitrate is present in the final product with consequent lessening of the hygroscopicity of the final product. A product which is substantially non-caking results; furthermore, in those few cases in which some caking may take place, the resultant cake is more easily broken up. If potassium sulfate or ammonium sulfate is added, it is desirable to do so at the beginning of the ammoniation.

The amount of potassium salts added may be varied, but it is preferred to add enough potassium salts to produce a final product containing from 7% to 20% of K₂O. Other soil enriching agents, if used, are generally added in small amounts to produce a final product containing the desired amount of such other soil enriching agents. Thus, boron salts may be added in amount to produce a product containing from .02% to .05% boron, preferably .04%; manganese salts are added in amount to produce a product containing .02% to .05% preferably .04% manganese; copper salts are added in amount to produce a product containing .002% to .005%, preferably .004% copper; zinc salts are added in amount to produce a product containing .002% to .005%, preferably .004% zinc; molybdenum salts are added in amount to produce a product containing .001% to .002%, preferably .0015% molybdenum and magnesium salts are added in amount to produce a product containing up to 3% magnesium.

The ammoniated mass enters the blender at a temperature of from about 75° C. to about 100° C., preferably from about 82° C. to about 93° C. Recycled material enters the blender at a temperature of from about 55° C. to about 65° C., preferably about 65° C. The resultant mixture enters the drier at a temperature of from about 60° C. to about 80° C., preferably about 70° C. It exits from the drier at a temperature of from about 100° C. to about 120° C., preferably about 105° C. to about 110° C. The driers may be externally heated, the gas temperatures at the hot end of the drier may be from about 400° C. to about 450° C., preferably about 450° C.; at the cool end of the drier the temperatures of the heating gas may be from about 110° C. to about 150° C., preferably about 130° C. Heat exchange media contacting wet material should be at a temperature not exceeding about 480° C. and those contacting dry material at a temperature not exceeding about 145° C. to minimize decomposition. The product leaving the drier contains not more than about 2% moisture.

Desirably from 25% to 65% of the dried product leaving the cooler is recirculated, mixed with the ammoniated material, and the mixture passed through the drier. An important factor in effecting efficient drying without fouling the equipment is to control the liquid (water plus water-soluble solids) content of the material entering the drier so that it is within the range of from about 15% to about 45%, preferably from about 25% to about 35%. This is accomplished by mixing with the ammoniated material an amount of dry product in finely divided form which will result in a mixture containing a liquid content within this range. The particle size of the product thus mixed with the ammoniated material desirably is such that ⅓ of the material will pass through an 8 mesh screen and be retained on a 50 mesh screen and ⅔ will pass through a 50 mesh screen.

The liquid content of the material entering the drier is determined by ascertaining the weight of water present in the material and adding thereto the weight of the salts present in this material and soluble in water at the temperature of the material entering the drier. The amount of water can be determined in any known manner, for example, by drying a sample, e. g., by evaporating it to dryness, and determining the loss in weight of the dried sample. The amount of salts soluble in water at the temperature of the material entering the drier can be determined by removing a small amount of the liquid phase from a sample of the material, for example, by applying pressure to the sample and then determining the dissolved solids content of the liquid thus removed by evaporating it to dryness. The per cent liquid phase present may readily be calculated from these data.

From the drier the product passes through a cooler where it is subjected to a stream of air or other inert gas and is thus cooled to about 70° C.

The dried product employing a mixture of $HNO_3$ and $H_2SO_4$ or $HNO_3$, $H_2SO_4$ and $H_2PO_4$ as acidulating agent may contain principally dicalcium phosphate, ammonium phosphate, ammonium nitrate, calcium sulfate, and potassium salts. Employing $HNO_3$ and phosphoric acid as the acidulating mixed acid the final product differs from that noted above chiefly in that it contains little or no calcium sulfate. In general, when using phosphoric acid as a constituent of the acidulating agent it is not necessary to use triple superphosphate along with the phosphate rock. In other words, the increased $P_2O_5$ content of the final product over and above that derived from phosphate rock may come from either the triple superphosphate or the use of phosphoric acid as a constituent of the mixed acid.

In general the final product using $NHO_3$ and $H_2SO_4$ as the acidulating medium contains from 9% to 11% by weight of available $P_2O_5$, from 9% to 18% nitrogen and from 7% to 20% K₂O. Employing triple superphosphate or phosphoric acid as a constituent of the mixed acid the final product contains from 11% to 15% of available $P_2O_5$, from 9% to 18% nitrogen and from 7% to 20% K₂O.

The process of this invention may be carried out batchwise or continuously. Due to the relatively rapid rate at which the acidulation and ammoniation may be carried out and also due to the physical conditions of the materials in each step of the process, i. e., they are in every case in a relatively free-flowing condition so that they can be moved mechanically without fouling the equipment, the process of this invention lends itself admirably to continuous production of the desired final complete fertilizer.

The accompanying drawing shows diagrammatically a preferred layout of equipment for practicing the process of this invention. It will be understood the process may be carried out in other equipment.

In the drawing 10, 11 and 12 indicate storage tanks for the phosphoric, sulfuric and nitric acids, respectively. These tanks communicate through suitable lines with an acidulator, such as a pug mill 13. The nitric acid tank also communicates with a fume scrubber 14. In this scrubber fluorine and nitrogen compounds evolved in the pug mill and passing with the gases removed from the pug mill through the fume scrubbers are scrubbed with nitric acid. The scrubbing medium containing these fluorine and nitrogen compounds may be treated to recover the silicon fluoride or may be introduced into the pug mill 13 without such treatment to recover the silicon fluoride particularly when the quantity of silicon fluoride is small. The gas leaving the fume scrubber is substantially free of fluorine and nitrogen compounds.

A storage bin 16 for phosphate rock and a bin 17 for storing triple superphosphate communicate desirably through suitable measuring hoppers 18 with the pug mill 13. In lieu of the measuring hoppers 18 the storage bins may be provided with screw conveyors or other feeding devices for feeding continuously to the pug mill the phosphate rock with or without triple superphosphate at regulated rates. The mixed acid consisting of nitric, sulfuric and/or phosphoric acids may be introduced into the pug mill 13 continuously at a regulated rate, so that the acidulation takes place continuously within this pug mill, the acidulated material being discharged continuously through line 19 communicating with an ammoniator.

As shown in the drawing, this ammoniator consists of three similar vessels 20. While the drawing shows three such vessels, it will be understood any desired number may be employed, preferably three or four.

Each vessel 20 communicates with an ammonia storage tank 21. The lines leading from this storage tank to each vessel each passes into a vaporizer 22 for vaporizing the liquid ammonia removed from the storage tank 21. The gaseous ammonia flows from each vaporizer into the vessel communicating therewith. Each vessel desirably is provided with a motor-driven agitator 23. A water line 24 leads into the first vessel of the series to supply water, if necessary, to provide the desired water content in the acidulated mixture subjected to ammoniation. The vessels 20 are interconnected by lines 25 for flow from one vessel to the next, and the last vessel of the series is provided with a discharge line 26 leading into a blender 27. A potash storage tank 28 communicates with the last vessel of the series through a suitable measuring hopper 29. In lieu of this measuring hopper potash storage tank 28 may be provided with a screw conveyor or other device for feeding potash continuously from storage tank 28 into the vessel communicating therewith. If potassium sulfate is employed, the storage tank 28 communicates with the first vessel of the series. Storage facilities for supplying continuously other soil enriching constituents, such as those hereinabove enumerated desirably communicate with the last vessel of the series.

Blender 27 receives dried product through a line 31 hereinafter described. This blender is provided with a suitable agitator 32 for agitating the mixture producing a substantially uniform blend which may be fed continuously through line 33 into a rotary kiln drier 34. This kiln drier 34 may be provided with a burner 40 and a line 35 through which dust formed in the drier and combustion gases flow into a dust separator 36. Solid materials separated in dust separator 36 are fed through a line 37 into discharge line 38 connecting the drier 34 with the cooler 39.

Cooler 39 may be in the form of a rotary kiln equipped with a line 41 for supplying air or other cooling gas thereto. The cooling medium flows countercurrent to the flow of the hot dried granules and exits from the cooler 39 through a line 42 communicating with a dust collector 43. Solid material separating in dust collector 43 is discharged through a line 44 onto vibrating screens 45 where it mixes with dried product exiting from the cooler 39 through discharge line 46. Vibrating screens 45 effect separation of the fine granules from the coarse particles. The fine granules flow through lines 47 into collecting channel 48 from which they are transported to product collecting bin 49. The coarse particles flow through lines 50 into a collecting chamber 51 from which they are transported to a hammer mill 52 where they are finely ground. These finely divided particles are conveyed through the line 31 into the blender 27. A line 53 desirably leads from the product bin 49 to the line 31 permitting the withdrawal of the desired amount of final product and the blending thereof with material fed to blender 27 to produce a mixture in the blender having the desired water content for efficient drying, as hereinabove disclosed.

The following examples are illustrative of the practice of the invention to produce complete fertilizers containing 12% $N_2$, 12% $P_2O_5$ and 12% $K_2O$. It will be understood the invention is not limited to these examples. In these examples all parts are by weight:

*Example I*

16,600 pounds of phosphate rock (34% $P_2O_5$), 2,740 pounds of triple superphosphate (48% $P_2O_5$) and mixed acid consisting of 36,990 parts of 42% nitric acid and 6,150 parts of 94% sulfuric acid are introduced into the acidulator. The acidulated material thus contains 35% water. It is agitated for ten minutes without external cooling. At the end of the acidulation, the temperature of the mass is about 70° C. The acidulated mass weighing 61,800 pounds is then introduced into the ammoniator. During acidulation 167 pounds of $SiF_4$, 233 pounds of $NO_2$ and 280 pounds of water leave the acidulator in the form of gases which may be passed through the fume scrubber to recover the silicon fluoride and nitrogen dioxide. 4,290 pounds of ammonia are employed to effect the ammoniation. This corresponds to .675 mol of ammonia per equivalent of acid used in the acidulation step.

900 pounds of water and 11,420 pounds of potassium chloride are introduced into the first and last of the three ammoniation vessels, respectively, while agitating. The ammoniation is effected at a temperature near the boiling point of the mixture and takes about two hours. 12,990 pounds of water are evaporated during the ammoniation.

The ammoniated slurry consisting of 65,420 pounds of which 15% is water, is introduced into the blender where it is mixed with 87,400 pounds of dried product having a particle size such that it all passes an 8 mesh screen and 60% passes through a 50 mesh screen. Thus, a total of 87,400 pounds of dry product are mixed with the ammoniated slurry producing a mixture containing 152,820 pounds having a water content of 7.5% and a liquid content of about 35% at 70° C. This mixture is passed through the drier entering at 70° C. and leaving at 110° C. It then passes through the cooler where it is cooled to 70° C. 143,400 pounds of dry product are thus produced. In the drier and cooler approximately 9,420 pounds of water are removed along with approximately 200 pounds of nitrogen salts. The dried product is passed through vibratory screens producing approximately 56,000 pounds of final product having a particle size such that it all passes an 8 mesh screen, which is passed to product storage, 18,570 pounds of finely divided product which is recirculated to the blender and 68,830 pounds of coarse particles which are ground and then recirculated to the blender. The final dry product passed to product storage is in the form of hard, solid granules which are homogeneous, non-caking, free flowing and chemically stable. The product has a water content of about 1%.

Example II 36 pounds of phosphate rock (34% $P_2O_5$), 5.7 pounds of phosphoric acid (85% $H_3PO_4$), 22 pounds of sulfuric acid (94.7% $H_2SO_4$) and 67.5 pounds of nitric acid (42% $HNO_3$) are introduced into the acidulator. The acidulated material thus contains about 32% water. It is agitated for ten minutes without external cooling. At the end of the acidulation, the temperature of the mass is about 73° C. The acidulated mass weighing 129.7 pounds is then introduced into the ammoniator. During the acidulation, a total of about 1.5 pounds of gas, consisting of $SiF_4$, $NO_2$, and water, leave the acidulator and may be passed through the fume scrubber to recover the silicon fluoride and nitrogen dioxide. 11.9 pounds of ammonia are employed to effect the ammoniation. This corresponds to .618 mol of ammonia per equivalent of acid used in the acidulation step.

24.6 pounds of potassium chloride (62.5% $K_2O$) are introduced into the last of three ammoniation vessels while agitating. The ammoniation is effected at a temperature near the boiling point of the mixture and takes about two hours. 12 pounds of water are evaporated during the ammoniation.

The ammoniated slurry consisting of 154.2 pounds, of which 18% is water, is introduced into the blender where it is mixed with 216.0 pounds of dried product having a particle size such that it all passes an 8 mesh screen and 60% passes through a 50 mesh screen. Thus, a total of 216.0 pounds of dried product are mixed with the ammoniated slurry producing a mixture containing 370.2 pounds having a water content of 7.5% and a liquid content of about 35% at 70° C. This mixture is passed through the drier entering at 70° C. and leaving at 110° C. It then passes through the cooler where it is cooled to 70° C. 344.0 pounds of dry product are thus produced. In the drier and cooler approximately 25.5 pounds of water are removed along with approximately 0.7 pound of nitrogen salts. The dried product is passed through vibratory screens producing approximately 128 pounds of final product having a particle size such that it all passes an 8 mesh screen, which is passed to product storage, 46 pounds of finely divided product, which is recirculated to the blender, and 170 pounds of coarse particles which are ground and then recirculated to the blender. The final dry product passed to product storage is in the form of hard, solid granules which are homogeneous, non-caking, free-flowing and chemically stable. The product has a water content of about 1%.

It will be noted this invention provides a process for producing complete fertilizers of lessened hygroscopicity in the form of hard, non-caking granules, substantially completely stabilized chemically and practically each particle of which is a complete fertilizer, the particles being non-segregating, homogeneous and substantially alike in chemical composition. The complete fertilizer is made of relatively low cost raw materials, the $P_2O_5$ content being derived chiefly from phosphate rock, and the nitrogen content from nitric acid and ammonia. Furthermore, the process of this invention effects acidulation and ammoniation rapidly and efficiently; the reaction masses in the various steps of the process are in the form of slurries which are relatively free-flowing, permitting the ready mechanical handling thereof without fouling the equipment.

In the specification all percentages are by weight, unless otherwise indicated.

Since different embodiments of the invention could be made without departing from the scope of the invention, it is intended that all matter contained in the above description or shown in the accompanying drawing shall be interpreted as illustrative and not in a limiting sense.

What is claimed is:

1. A process for preparing fertilizers which comprises the following steps: step 1, treating phosphate rock with a mixed acid containing nitric acid and at least one acid from the group consisting of sulfuric and phosphoric acids in the proportions of from about 7 to about 20 equivalents of mixed acid per mol of $P_2O_5$ in the phosphate rock, said mixed acid containing nitric acid in amount of from about 40% to about 80% of the acid equivalents, the acidulation of the rock being carried out in the presence of water amounting to from about 15% to about 40% by weight of the total mixture; step 2, ammoniating the acidulated material employing from about 0.6 to about 0.8 mol of ammonia per equivalent of acid and sufficient water so that the ammoniated material leaving the ammoniation treatment contains from about 15% to about 30% by weight of water and incorporating a potassium salt in amount to produce a final product containing from about 7% to about 20% by weight of $K_2O$; step 3, mixing the material from step 2 with a portion of the dry product from step 4 to produce a mixture containing from about 15% to about 45% by weight of liquid at a temperature of from about 60° to about 80° C.; and step 4, drying the resultant mixture to produce a fertilizer containing not more than about 2% by weight of moisture and withdrawing as product dried mixture not passed to step 3.

2. The process defined in claim 1 in which the potassium salt is incorporated in the ammoniated material prior to completion of the ammoniation of said material.

3. A process for preparing fertilizers which comprises the following steps: step 1, treating phosphate rock with a mixed acid containing nitric acid and at least one acid from the group consisting of sulfuric and phosphoric acids in the proportions of from about 9 to about 16 equivalents of mixed acid per mol of $P_2O_5$ in the phosphate rock, said mixed acid containing nitric acid in amount of from about 60% to about 80% of the acid equivalents, the acidulation of the rock being carried out in the presence of water amounting to from about 15% to about 40% by weight of the total mixture; step 2, ammoniating the acidulated material at a temperature near its boiling point employing from about 0.6 to about 0.8 mol of ammonia per equivalent of acid and sufficient water so that the ammoniated material leaving the ammoniation treatment contains from about 15% to about 18% by weight of water and incorporating a potassium salt in amount to produce a final product containing from about 7% to about 20% by weight of $K_2O$; step 3, mixing the resultant material at a temperature of from about 75° to about 100° C. with from about 25% to about 65% by weight of the product produced in step 4 at a temperature of from about 55° to about 65° C. to produce a mixture at a temperature of from about 60° to about 80° C. containing from about 25% to about 35% by weight of liquid; and step 4, drying the resultant mixture to produce a fertilizer containing not more than about 2% by weight of moisture and withdrawing as product dried mixture not passed to step 3.

4. A continuous process for preparing fertilizers which comprises the following steps: step 1, continuously introducing phosphate rock and mixed acid containing nitric acid and at least one acid from the group consisting of sulfuric and phosphoric acids in the proportions of from about 7 to about 20 equivalents of mixed acid per mol of $P_2O_5$ in the phosphate rock, said mixed acid containing nitric acid in amount of from about 40% to about 80% of the acid equivalents, the acidulation of the rock being carried out in the presence of water amounting to from about 15% to about 40% by weight of the total mixture; step 2, continuously discharging the acidulated rock from the acidulation zone and introducing the same into an ammoniation zone into which ammonia is continuously introduced in amount of from about 0.6 to about 0.8 mol of ammonia per equivalent of acid and from which ammoniated material is continuously withdrawn, sufficient water being introduced into the ammoniation zone so that the ammoniated material continuously leaving the ammoniation zone contains from about 15% to about 30% by weight of water, and continuously incorporating a potassium salt in amount to produce a final product containing from about 7% to about 20% by weight of $K_2O$; step 3, continuously mixing the potassium salt-containing mixture with a portion of dry fertilizer produced in step 4 to form a mixture containing from about 15% to about 45% by weight of liquid at a temperature of from about 60° to about 80° C.; and step 4, continuously passing this mixture through a drier to produce a fertilizer containing not more than about 2% by weight of moisture and withdrawing as product dried mixture not passed to step 3.

5. A continuous process for preparing fertilizers which comprises the following steps: step 1, continuously introducing phosphate rock and mixed acid containing nitric acid and at least one acid from the group consisting of sulfuric and phosphoric acids in the proportions of from about 9 to about 16 equivalents of mixed acid per mol of $P_2O_5$ in the phosphate rock, said mixed acid containing nitric acid in amount of from about 60% to about 80% of the acid equivalents, the acidulation of the rock being carried out in the presence of water amounting to from about 15% to about 40% by weight of the total mixture; step 2, continuously discharging the acidulated rock from the acidulation zone and introducing the same into an ammoniation zone into which ammonia is continuously introduced in amount of from about 0.6 to about 0.8 mol of ammonia per equivalent of acid and from which ammoniated material is continuously withdrawn, sufficient water being introduced into the ammoniation zone so that the ammoniated material continuously leaving the ammoniation treatment contains from about 15% to about 18% by weight of water, and continuously incorporating potassium salt in amount to produce a final product containing from about 7% to about 20% by weight of $K_2O$; step 3, continuously mixing the potassium salt-containing mixture with a portion of dry fertilizer produced in step 4 to form a mixture containing from about 25% to about 35% by weight of liquid at a temperature of from about 60° to about 80° C. and step 4, continuously passing this mixture through a drier to produce a fertilizer containing not more than about 2% by weight of moisture and withdrawing as product dried mixture not passed to step 3.

6. A process for preparing fertilizers which comprises the following steps: step 1, treating phosphate rock with a mixed acid consisting of nitric and sulfuric acids in the proportions of from about 7 to about 20 equivalents of mixed acid per mol of $P_2O_5$ in the phosphate rock, said mixed acid containing nitric acid in amount of from about 40% to about 80% of the acid equivalents, the acidulation of the rock being carried out in the presence of water amounting to from about 15% to about 40% by weight of the total mixture; step 2, ammoniating the acidulated material employing from about 0.6 to about 0.8 mol of ammonia per equivalent of acid and sufficient water so that the ammoniated material leaves the ammoniation treatment containing from about 15% to about 30% by weight of water, and incorporating a potassium salt in amount to produce a final product containing from about 7% to about 20% by weight of $K_2O$; step 3, mixing the material from step 2 with a portion of the dried product from step 4 to produce a mixture containing from about 15% to about 45% by weight of liquid at a temperature of from about 60° to about 80° C.; and step 4, drying the mixture from step 3 to produce a product containing not more than about 2% by weight of moisture, and withdrawing as product dried mixture not passed to step 3.

7. The process as defined in claim 6, in which up to 30% of triple superphosphate based on the weight of the phosphate rock is added to the phosphate rock subjected to acidulation.

8. A process for preparing fertilizers which comprises the following steps: step 1, treating phosphate rock with a mixed acid consisting of nitric and sulfuric acids in the proportions of from about 9 to about 16 equivalents of mixed acid per mol of $P_2O_5$ in the phosphate rock, said mixed acid containing nitric acid in amount of from about 60% to about 80% of the acid equivalent, the acidulation of the rock being carried out in the presence of water amounting to from about 15% to about 40% by weight of the total mixture; step 2, ammoniating the acidulated material employing from about 0.6 to about 0.8 mol of ammonia per equivalent of acid and sufficient water so that the ammoniated material leaves the ammoniation treatment containing from about 15% to about 30% by weight of water, the ammoniation during the initial stages at least being carried out at a temperature near the boiling point of the material subjected to ammoniation, and incorporating potassium chloride during the ammoniation treatment in amount to produce a product containing from about 7% to about 20% by weight of $K_2O$; step 3, mixing the resultant material from step 2 with crushed particles produced in step 6 to form a mixture containing from about 25% to about 35% by weight of liquid at a temperature of from about 60° to about 80° C.; step 4, drying the mixture from step 3 to produce a product containing not more than about 2% by weight of moisture; step 5, cooling the dried product; and step 6, screening the dried product to separate the coarse particles from the finer particles, crushing the coarse particles, recirculating the crushed particles to step 3 for mixing with the material produced in step 2 and withdrawing as product finer particles produced in the screening of the dried product.

9. The process as defined in claim 8, in which from about 15% to about 20% of triple superphosphate based on the weight of the phosphate rock is mixed with the phosphate rock subjected to acidulation.

10. A process for preparing a complete fertilizer which comprises the following steps: step 1, treating phosphate rock with a mixed acid consisting of nitric and phosphoric acids in the proportions of from about 9 to about 16 equivalents of mixed acid per mol of $P_2O_5$ in the phosphate rock, said mixed acid containing nitric acid in amount of from about 70% to about 80% of the acid equivalents, the acidulation of the rock being carried out in the presence of water amounting to from about 15% to about 40% by weight of the total mixture; step 2, ammoniating the acidulated material employing from about 0.6 to about 0.8 mol of ammonia per equivalent of acid and sufficient water so that the ammoniated material leaves the ammoniation treatment containing from about 15% to about 30% by weight of water and incorporating a potassium salt in the ammoniated material in amount to produce a final product containing from about 7% to about 20% by weight of $K_2O$; step 3, mixing the resultant material from step 2 with a portion of the dried product from step 4 to produce a mixture containing from about 15% to about 45% by weight of liquid at a temperature of from about 60° to about 80° C.; and step 4, drying the mixture from step 3 to produce a product containing not more than about 2% by weight of moisture and withdrawing as product dried mixture not passed to step 3.

11. A process for preparing a complete fertilizer which comprises the following steps: step 1, treating phosphate rock with a mixed acid consisting of nitric and phosphoric acids in the proportions of from about 9 to about 16 equivalents of mixed acid per mol of $P_2O_5$ in the phosphate rock, said mixed acid containing nitric acid in amount of from about 70% to about 80% of the acid equivalents, the acidulation of the rock being carried out in the presence of water amounting to from about 15% to about 40% by weight of the total mixture; step 2, ammoniating the acidulated material employing from about 0.6 to about 0.8 mol of ammonia per equivalent of acid and sufficient water so that the ammoniated material leaves the ammoniation treatment containing from about 15% to about 18% by weight of water, the ammoniation during the initial stages at least being carried out at a temperature near the boiling point of the material subjected to ammoniation, and incorporating a potassium salt in the ammoniated material in amount to produce a product containing from about 7% to about 20% by weight of $K_2O$; step 3, mixing the resultant material from step 2 with a portion of the dried product from step 4 to produce a mixture containing from about 25% to about 35% by weight of liquid at a temperature of from about 60° to about 80° C.; and step 4, drying the mixture from step 3 to produce a product containing not more than about 2% by weight of moisture and withdrawing as product dried mixture not passed to step 3.

References Cited in the file of this patent

UNITED STATES PATENTS

| Number | Name | Date |
|---|---|---|
| 1,788,828 | Goldberg | Jan. 13, 1931 |
| 1,849,989 | Moore | Mar. 15, 1932 |
| 1,916,429 | Larsson | July 4, 1933 |
| 1,948,520 | Harvey | Feb. 27, 1934 |
| 2,102,831 | Brill | Dec. 21, 1937 |
| 2,448,126 | Shoeld | Aug. 31, 1948 |

FOREIGN PATENTS

| Number | Country | Date |
|---|---|---|
| 357,473 | Great Britain | Sept. 24, 1931 |